Figure 1:
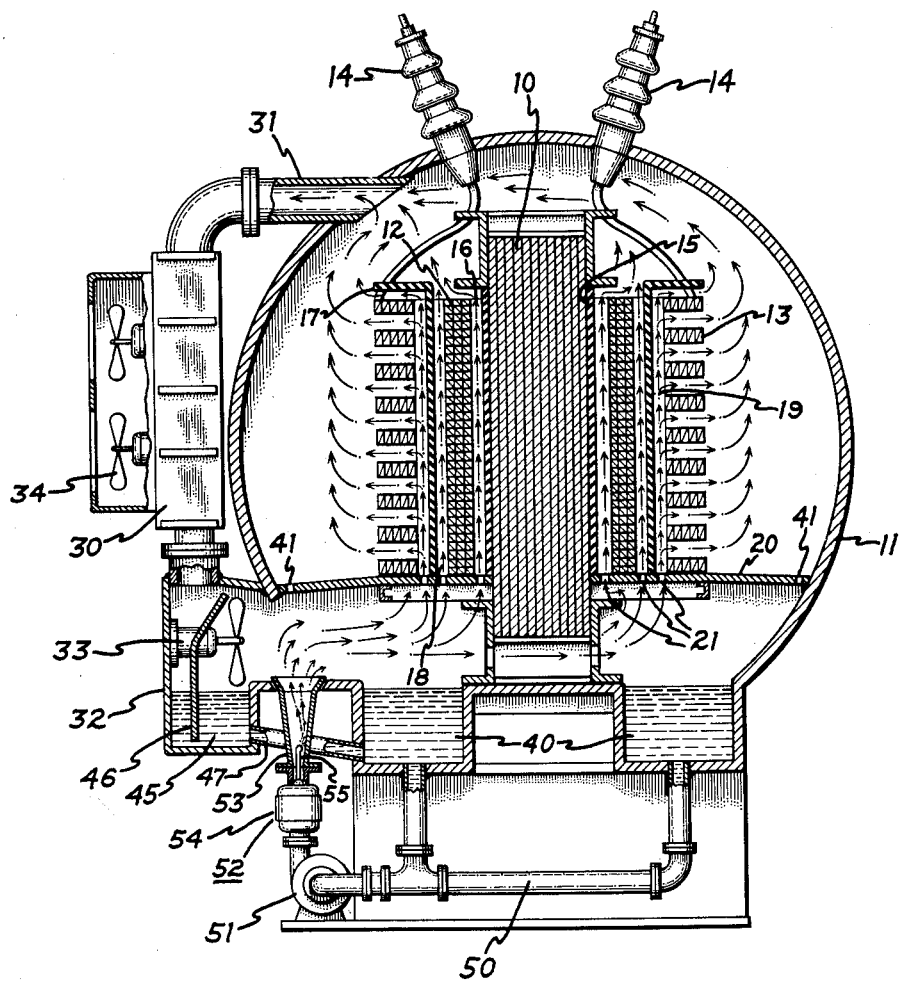

June 27, 1961 G. CAMILLI 2,990,443
COOLING SYSTEM AND METHOD FOR ELECTRICAL APPARATUS
Filed Oct. 10, 1958 2 Sheets-Sheet 1

Inventor,
Guglielmo Camilli,
by Gilbert P. Tarleton
His Attorney.

United States Patent Office 2,990,443
Patented June 27, 1961

2,990,443
COOLING SYSTEM AND METHOD FOR
ELECTRICAL APPARATUS
Guglielmo Camilli, Pittsfield, Mass., assignor to General
Electric Company, a corporation of New York
Filed Oct. 10, 1958, Ser. No. 766,489
11 Claims. (Cl. 174—15)

This invention relates to an improved cooling system and method of cooling for electrical apparatus of the type having at least one conductor immersed in a gaseous dielectric material, and more in particular to a system and method for cooling and insulating electrical apparatus immersed in a gas filled enclosure. While the following specification is directed primarily to the disclosure of my invention as applied to a transformer, it will be obvious that it may be equally well applied to other types of electrical apparatus without departing from the spirit or scope thereof.

Transformers of one type are comprised of at least one electrical winding surrounding a magnetic core and disposed within a sealed enclosure. The enclosure may be filled with a dielectric insulating fluid material which serves to insulate high potential points of the winding as well as to dissipate the heat which has developed in the windings. In such transformers it is, of course, preferable to circulate the dielectric fluid through the windings and an external circulation system including a radiator in order to maintain the temperature of the winding within safe operating limits. When the dielectric fluid material is a liquid such as transformer oil, the difficulty of removing heat from the windings is not acute, since the oil is a good medium for heat transfer, and thus high velocities of oil through the winding and external circulation system are not generally required.

With the relatively recent development of high strength gaseous dielectric materials, such as sulphur hexafluoride, many advantages of using such materials as the insulating medium in transformers have become apparent. For example, the use of gaseous materials substantially reduces the weight of the transformers, reduces the noise transmitted from the core to the surrounding region, and also eliminates the dangers occasioned by the use of inflammable materials such as oil. In spite of these advantages, however, the use of high strength gaseous dielectric materials in transformers has been limited in view of the relatively poor heat transfer characteristics of the gaseous materials, since when such materials are used alone, very high gas flow velocities are required in order to achieve the necessary dissipation of heat from the windings.

This problem is exemplified by a typical operating condition of a gas filled transformer in which the gas temperature upon entrance to the windings is about 70° C. and the temperature rise of the gas in the windings (which operate at a mean temperature of 100° C.) is of the order of 10° C. When sulphur hexafluoride is employed as the gaseous dielectric material, gas flow velocities of about 25 cubic feet per minute are necessary in order to dissipate one kilowatt of power loss from the windings. Since the largest of the present day gas filled transformers must dissipate about 80 kilowatts under full load conditions, very high gas velocities through the windings and external circulation system are necessary. Due to this requirement for high gas velocities, the largest present day transformers employing only high strength gaseous materials for insulation and cooling have ratings of about 10,000 kva., as compared with the 300,000 kva. capacity of oil filled units. Since the power needed to pump the gaseous material rises as the cube of the gas velocity, extension of gas filled transformer ratings to the maximum ratings of oil filled transformers has been impractical.

As one solution to the problem of cooling gas filled transformers, it has been suggested that the gaseous material comprise the vapors of a volatile liquid sprayed upon the windings, whereby the efficiency of the cooling is increased as a result of the use of the latent heat of vaporization of the liquid. A number of difficulties have been encountered in this cooling arrangement, however, such as the necessity for an additional dielectric material to serve as insulation when the windings have not attained sufficient heat to vaporize the liquid, as well as the problem of insuring adequate coverage of the windings by the sprayed liquid material.

While vapors of high dielectric strength liquids have also been employed to increase the dielectric strength of low dielectric strength such as nitrogen gases, such arrangements have previously relied upon the partial pressure of the liquid to introduce the vapors in the gas, and hence sufficient vapor would not be introduced in the gas to have any material effect on the cooling efficiency of electrical apparatus employing this technique. When the vapors were introduced into the gas by this means, the minimum temperature of operation of the apparatus was limited since the dielectric strength of the gas decreases with decreases in temperature due to the decrease in partial pressure of the liquid, and, of course, no increase was present when the partial pressure of the liquid was zero. Hence such systems are useful primarily only on indoor apparatus not subject to wide ambient temperature variations.

It is, therefore, an object of this invention to provide an improved cooling system and method for cooling electrical apparatus such as transformers and the like of the type comprising an electrical conductor immersed in a gas filled enclosure.

Another object is to provide means for cooling an electrical apparatus for the type surrounded by a gaseous dielectric material, the cooling means requiring substantially lower gas flow velocities through the apparatus to effect the cooling thereof than is required when the only cooling is effected by the passage of the gas through the apparatus.

Still another object of this invention is to provide a gas insulated electrical apparatus, and a cooling system and method of cooling the apparatus in which no additional dielectric materials are required for insulating the apparatus when the temperature thereof is insufficient to evaporate a volatile liquid.

A further object is to provide an improved cooling system and method for cooling of a gaseous insulated electrical apparatus, the system and method being characterized by the fact that effective cooling is readily obtained in inaccessible locations on the apparatus.

A still further object of this invention is to provide an improved means for cooling and insulating the windings of electrical induction apparatus of the type employing a high strength gaseous dielectric medium, the cooling system being characterized by the fact that the gaseous dielectric is employed as the primary insulating medium, and the latent heat of vaporization of a volatile dielectrtic liquid is employed to enhance the efficiency of the cooling system.

Briefly stated, in accordance with the preferred aspects of my invention, I provide an electrical apparatus comprising an electrical device preferably disposed in a sealed enclosure. The device has a current carrying conductor which may be in the form of a winding, and an electric potential exists between portions of the apparatus, such as between the conductor and enclosure. A dielectric gaseous material is provided in the enclosure, and means are provided for circulating the gaseous material throughout the enclosure and in heat transfer relationship with the device. The dielectric gaseous material is non-condensable within the normal operating temperature range of the apparatus. A volatile dielectric liquid having a boiling point within the normal operating range of the device is also provided within the enclosure, and means are provided for introducing a vaporizable mist of the liquid in the circulation path of the gaseous material. The expression "vaporizable mist" is intended to mean a plurality of fine droplets of unvaporized liquid, as contrasted to molecules or atoms of gas. The gaseous material is circulated at a velocity sufficient for it to carry the fine droplets of unvaporized liquid mist through a tortuous fluid flow path in the interior of the apparatus. This is necessary because the impetus of the vaporizable mist, as it is introduced into the gaseous material and before it is circulated thereby, is insufficient to cause it to flow through the tortuous path.

In the preferred embodiment of my invention, in order to attain the maximum benefit from a minimum quantity of liquid dielectric material, the liquid is introduced into the gaseous dielectrtic material in sufficient quantities that the gaseous dielectric material is supersaturated, i.e., has a liquid phase at the temperature at which the gaseous material first comes into heat transfer relationship with the electric device, but that no substantial liquid phase be present in the gaseous material after its temperature has risen through a predetermined range as a result of passing into heat transfer relationship with the electric device. The liquid phase is, of course, in the form of a mist.

While the specification concludes with claims particularly pointing out and distinctly claiming the subject matter which I regard as my invention, it is believed that the invention will be better understood from the following description taken in connection with the accompanying drawings.

Figure 2:
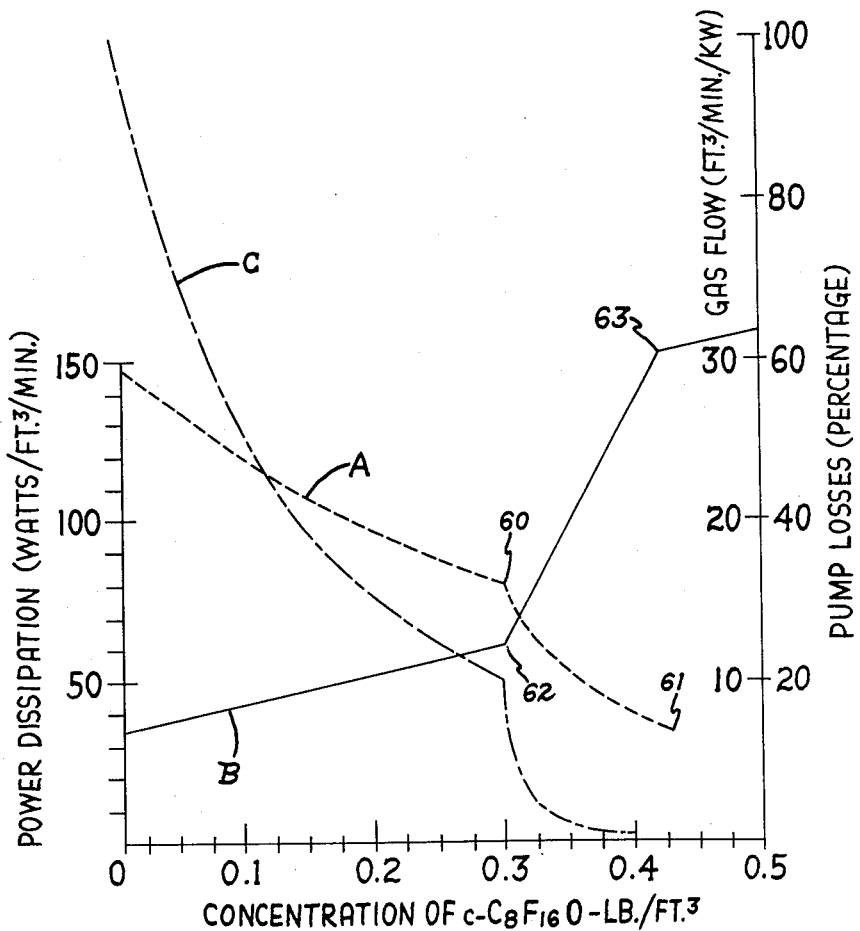

In the drawings,

FIG. 1 is a cross-sectional view of a transformer embodying the cooling system of the preferred form of my invention, FIG. 2 is a curve of the heat transfer characteristics of typical materials which may be employed in the cooling system of FIG. 1, and illustrating the characteristics of power dissipated by the cooling system, necessary flow velocity of the gas, and losses in pumping the gas.

Referring now to FIG. 1, therein is illustrated a transformer having a magnetic core 10 disposed in a generally cylindrical enclosure 11. The core 10 has a winding leg according to the conventional practice, which is surrounded by a low voltage winding 12 and a high voltage winding 13. The high voltage winding 13 is, of course, preferably disposed radially outwardly of the low voltage winding. While the low voltage winding is depicted in FIG. 1 as being a barrel-type winding, and the high voltage winding is depicted as comprising a plurality of axially spaced apart disc-shaped coils, it is obvious that other coil configurations may be employed without departing from the spirit and scope of my invention. External connection to the winding may be made by means of high voltage bushings 14 disposed on the enclosure 11 in the conventional manner.

An insulating barrier 15 may be provided between the core and the low voltage winding, and the low voltage winding is radially spaced from the carrier 15 by a vertical duct 16. The low voltage winding is separated from the high voltage winding by another barrier 17, another duct 18 separating the barrier 17 from the low voltage winding. Similarly, the high voltage winding is spaced from the barrier 17 by any conventional means to provide a vertical cooling duct 19. A horizontal barrier 20 is provided across the enclosure 11 below the windings, the barrier 20 being provided with apertures 21 to permit the flow of a gas through the barrier 20 and upwardly through the ducts 16, 18 and 19. The barrier 17 between the high and low voltage windings may be shaped with a flange at its upper end in order to direct any gas flowing upwardly through the duct 19 to pass radially outwardly between the adjacent spaced apart coils of the high voltage winding, thereby assuring uniform contact of the gas with all portions of the coils. The duct 19 provides a fluid entrance channel with a plurality of fluid distribution channels extending substantially perpendicularly, radially thereof; these channels thus define a tortuous fluid flow path through the interior of the transformer. As indicated in FIG. 1 by the arrows, fine droplets of liquid are carried by a gas that is circulated through the tortuous fluid flow path into contact with the elements in the interior of the transformer.

An external radiator 30, which may be of any conventional type, is connected to the top of the enclosure 11 above the barrier 20 by a conduit 31. The lower end of the radiator 30 is connected by way of a pump chamber 32 to the lower end of the enclosure 11 below the barrier 20. A pump or fan 33 disposed in the pump chamber 32 is arranged to force a gaseous dielectric material upwardly through the apertures 21 in the barrier 20, thence upwardly through the ducts 16 and 18 and 19 into the upper portion of the enclosure 11, thence through the conduit 31 and downwardly through the radiator 30. Cooling fans 34 may be provided on the radiator in order to increase the dissipation of heat from the transformer.

A sump 40 is provided in the bottom of the enclosure 11, and the baffle 20 may be provided with apertures 41 in order that any liquid above the barrier 20 will drip down into the sump 40. For this purpose, it is also desired that the baffle 20 be inclined slightly toward the apertures 41. A sump 45 may also be provided in the pump chamber 32, the sump 45 being arranged, such as by means of baffles 46, to collect any condensed materials from the radiator 30. The sump 45 is preferably connected to the sump 40 by conduit means 47.

In the illustrated embodiment of my invention, the sump 40 is connected by way of conduits 50 to a pump 51, the pump 51 being adapted to withdraw liquid from the sump 40 and inject it into an atomizing device 52. The atomizing device 52 comprises an inverted conical impeller 53 driven for rotation on a vertical axis by a motor 54, the upper end of the conical member 53 being open to the space in front of the pump 33 below the barrier 20 and the enclosure 11. A nozzle 55 extends upwardly in the lower end of impeller 53, and it is connected directly through the motor shaft to the pump 51, the nozzle 55 remaining stationary with rotation of the impeller, and being adapted to direct fluid against the inner walls of the impeller 53. The atomizer 52 is arranged to introduce a fine vaporizable mist of the liquid from sump 40 into the circulation path of the gas in the transformer, the rotation of the impeller 53 serving to throw fine droplets of the liquid by centrifugal force into the circulation path of the gas. It will be obvious, of course, that other forms of atomizing devices may be equally well applied in the cooling system of my invention without departing from the spirit or scope thereof.

Similarly, it will be obvious that other structural arrangements may be employed to collect liquid from the enclosure 11 and radiator 30 and introduce it in the form of a fine mist in the circulation path of the gaseous insulation in the transformer.

The enclosure 11 is filled with a high strength gaseous dielectric material, preferably an electronegative material, such as sulphur hexafluoride. The gaseous material should not condense within the normal operating range of temperatures of the transformer. The gaseous dielectric is directed through the transformer in the manner previously described, by means of the pump 33 so that it passes through the transformer windings to remove the heat therefrom, and through the radiator 30 to dissipate the heat to the atmosphere. The enclosure 11 is also provided with a quantity of a high strength volatile liquid dielectric material, also preferably an electronegative material, which collects in the sump 40. In operation of the transformer, the liquid is withdrawn from the sump 40 and forced by means of the pump 51 into the atomizer 52, which serves to introduce a fine mist of the liquid in the circulation path of the gas, as shown by the arrows in FIG. 1. While some of the liquid evaporates in the gas, the liquid phase remains in the form of a mist that is directed through the transformer windings with the gas. Liquid evaporated in the gas is condensed in the radiator 30, and returns to the sump 40 by way of the sump 45 and conduit 47.

When the load on the transformer is not great, the velocity of gaseous dielectric through the windings due to the pump 33 may be sufficient to remove the necessary amount of heat from the windings without the introduction of the liquid in the system. In this event, the pump 51 and atomizer 52 may be turned off, and the gaseous dielectric material will serve as a coolant as well as an insulator. When the load on the transformer increases, thereby increasing the heat generated by the windings, the pump 51 and atomizer 52 may be energized in order to increase the dissipation of the heat from the windings, and even further increases in the transformer load may necessitate the energizing of the fans 34 to increase the heat removal from the radiator 30. The energization of the pump 51, atomizer 52 and fans 34 at the proper moment to dissipate the necessary amount of heat may be automatically controlled as a function of the transformer load according to conventional arrangements.

As stated previously, the liquid dielectric material should be volatile and have a high dielectric strength. The dielectric strength should be maintained in both the liquid and vapor phases, and the liquid should have a boiling point in the vicinity of the mean temperature of the transformer windings. In order to insure reliable operation under low ambient temperature conditions, it is also desirable that the material have a freezing point below $-40°$ C. The material should also be stable chemically in the liquid and vapor phases in order that it does not react with the materials of the transformer. A satisfactory material having these desirable properties is perfluoropropyltetrahydropyran (cyclic $C_8F_{16}O$), a perfluoro-cyclic-ether. While the following examples are based on the use of this material with sulphur hexafluoride as the gaseous dielectric material, it will be obvious, of course, that other materials having the necessary dielectric strength and other stated characteristics may be equally well employed without departing from the spirit or scope of my invention.

Assuming that sulphur hexafluoride is forced through a heater device such as the windings of a transformer, and that the inlet temperature of the gas is 70° C. and the outlet temperature of the gas is 80° C. (10° C. temperature rise in the windings), and also assuming that the pressure of the sulphur hexafluoride is 30 p.s.i. absolute, the power dissipated by a gas flow of 1 cubic foot per minute is 34.2 watts, and thus a gas flow of 29.4 cubic feet per minute is required to dissipate 1 kilowatt of power in the device.

When droplets of cyclic $C_8F_{16}O$ are injected into a stream of sulphur hexafluoride, such as in the form of a mist, evaporation of the droplets takes place until either the excess vapor pressure or else the liquid phase vanishes. In the former case the sulphur hexafluoride will then be supersaturated and a liquid phase in the form of a mist will be present therein, and in the latter case the gas will be unsaturated. If now sufficient cyclic $C_8F_{16}O$ is introduced into the sulphur hexafluoride to just saturate the gas at a temperature of 70° C., assuming the same conditions as in the previous example, a flow of 16.9 cubic feet per minute is required to dissipate 1 kilowatt of power from the device. This represents a reduction in gas flow velocity of 42 percent. This effect is illustrated by curve A in FIG. 2, the sulphur hexafluoride being saturated with cyclic $C_8F_{16}O$ at 70° C. at a concentration of slightly over 0.3 pounds per cubic feet (point 60 on curve A). The increase in cooling efficiency in this example results from the specific heat of the vapor.

If now sufficient cyclic $C_8F_{16}O$ is added to the sulphur hexafluoride that the sulphur hexafluoride will be just saturated at the gas outlet temperature (80° C.) the gas at the inlet to the device will have a liquid phase in the form of a fist and as a result of the latent heat of vaporization of the liquid, an equivalent gas flow of only 6.7 cubic feet per minute will be required to dissipate 1 kilowatt of power from the device. This effect is illustrated at point 61 on the curve A of FIG. 2, corresponding to a concentration of about 0.42 pound per cubic feet of cyclic $C_8F_{16}O$. Further increases in the concentration of cyclic $C_8F_{16}O$ in the gas results in further increases in the absorption of heat due to the specific heat of the additional liquid, and these increases are thus not as great as in the portion 60—61 of curve A.

The effect of removal of heat from a device is further shown in curve B of FIG. 2 which illustrates the effect of various concentrations of cyclic $C_8F_{16}O$ upon the power dissipation in watts per cubic feet per minute of gas flow. On this curve it is seen that the power dissipation increases gradually with increases in concentration of the liquid until the point 62 is reached which corresponds to the saturation of the gas at 70° C. From this point, the power dissipated increases rapidly with increases in concentration of the liquid until the point 63 is reached which corresponds to the saturation concentration of a liquid in the gas at the temperature of 80° C. (the gas outlet temperature). From the point 63, the power dissipated increases gradually with increases in concentration of the liquid as a result of the specific heat of the liquid.

The effect is further illustrated in terms of pump losses (i.e., a function of the power required to operate the pump 33) by curve C of FIG. 2. By this curve it is seen that the pump losses corresponding to a concentration of cyclic $C_8F_{16}O$ just sufficient to saturate the gas at the inlet temperature is about 20 percent of the pump loss when sulphur hexafluoride is employed alone. Further, the pump loss decreases to about 1 percent as compared with the loss employing only $SF_6$ when the concentration of cyclic $C_8F_{16}O$ is increased to just saturate the gas at the gas outlet temperature.

The foregoing examples illustrate the fact that substantial increases in the cooling efficiency of a gas transformer may be obtained by introducing a mist of a volatile liquid in the gas prior to the passage of the gas through the windings. Since many of the volatile liquids having the desirable characteristics as aforestated are expensive, the maximum cooling benefit may be obtained from the liquid when only a sufficient quantity is employed to just saturate the gas at the gas output temperature. If the expense of the gas is not a factor, it may, of course, be feasible to obtain further benefits in cooling efficiency by employing still further concentrations of a liquid in the gas.

Since a high dielectric strength gaseous material is employed, the dielectric strength of the apparatus is not dependent upon the introduction of the vapors into the system, and hence the apparatus may be used in locations having wide ambient temperature variations. For example, when cyclic $C_8F_{16}O$ vapors saturate sulphur hexafluoride at two atmospheres at 25° C., the increase in dielectric strength is only 5 percent in a uniform field, and at 60° C. the increase in dielectric strength is only 25 percent. Thus, while the cyclic $C_8F_{16}O$ enhances the dielectric strength of the sulphur hexafluoride slightly, the effect is not sufficiently great to permit redesigning the apparatus to take advantage of the increase, and hence the cyclic $C_8F_{16}O$ functions primarily only to increase the efficiency of the cooling system, and the sulphur hexafluoride provides the major insulation at all times. Since the dielectric strength of the sulphur hexafluoride does not decrease with temperature, there is no practical limit on the minimum temperature of operation of the apparatus.

A still further advantage is achieved by the cooling system of my invention by virtue of the fact that the liquid phase in the gas is in the form of a mist, i.e., fine droplets that are suspended by the gas, since the mist is carried with the gas and may thus be readily directed into relatively inaccessible locations in the transformer or other electrical device.

It will be obvious, of course, that in addition to the above disclosed system and method, other well known expedients may also be employed to increase the cooling efficiency of my system, as well as the dielectric strength thereof, such as increasing the pressure of the gaseous dielectric medium.

It will be understood, of course, that while the form of the invention herein shown and described constitutes the preferred embodiment of my invention, it is not intended herein to illustrate all of the possible equivalent forms or ramifications thereof. It will also be understood that the words employed are words of description rather than of limitation, and that various changes, such as changes in shape, relative size, and arrangement of parts, may be made without departing from the spirit or scope of the invention herein disclosed, and it is aimed in the appended claims to cover all such changes as fall within the true spirit and scope of my invention.

What I claim as new and desire to secure by Letters Patent of the United States is:

1. An electrical apparatus comprising an electric device in a sealed enclosure, said electric device having elements thereof spaced from each other so as to define a tortuous fluid flow path through its interior, a dielectric gaseous material in said enclosure, said gaseous material being non-condensable within the normal operating temperature range of said apparatus, means for circulating said gaseous material through said tortuous path in the interior of said apparatus, a volatile dielectric liquid having a boiling point within the normal operating range of said device, and means for spraying a vaporizable mist of said liquid in the circulation path of said gaseous material said spraying means imparting insufficient impetus to said vaporizable mist to cause its circulation through said tortuous path, the first mentioned means circulating said gaseous material at a velocity sufficient for said gaseous material to carry said mist through said tortuous path into contact with the interior of said device, whereby evaporation of said mist will cool the interior of said device.

2. An electric apparatus comprising an electric device in a sealed enclosure, said electric device having conductors therein spaced from each other so as to define a tortuous fluid flow path through its interior, at least one of said conductors having an electric potential different from said enclosure, a dielectric gaseous material in said enclosure, said gaseous material being non-condensable within the normal operating temperature range of said apparatus, means for circulating said gaseous material in said enclosure upwardly through said tortuous path in the interior of said device, a volatile dielectric liquid having a boiling point within the normal operating range of said device, and means for spraying a vaporizable mist of said liquid in the circulation path of said gaseous material, said spraying means imparting insufficient impetus to said vaporizable mist to cause its circulation through said tortuous path, the first mentioned means circulating said gaseous material at a velocity sufficient for said gaseous material to carry said mist through said tortuous path into contact with the interior of said device, whereby evaporation of said mist will cool the interior of said device.

3. An electric apparatus comprising an electrical winding disposed in a sealed enclosure, said electrical winding having elements thereof spaced from each other so as to define a tortuous fluid flow path through the interior of said apparatus, a dielectric gas in said enclosure, said gas being noncondensable within the normal operating temperature range of said apparatus, radiator means disposed externally of said enclosure, means for circulating said gas through said tortuous path in the interior of said apparatus defined by said winding to remove heat therefrom and through the radiator means to dissipate said heat to the atmosphere, sump means in said enclosure, a volatile liquid dielectric material in said sump and having a boiling point within the normal operating temperature range of said apparatus, means for introducing a vaporizable mist of said liquid material from said sump into the circulation path of said gas, and means for returning condensed liquid from said radiator to said sump means said introducing means imparting insufficient impetus to said vaporizable mist to cause its circulation through said tortuous path, the circulating means causing said gas to circulate at a velocity sufficient for said gas to carry said mist through said tortuous path into contact with the interior of said device, whereby evaporation of said mist will cool the interior of said device.

4. The electrical apparatus of claim 3 in which sufficient liquid is introduced into said gas to supersaturate said gas at the temperature of entrance of said gas into said winding, but insufficient to provide any substantial liquid phase in said gas at the exit temperature of said gas from said winding.

5. The electrical apparatus of claim 3 in which said gas is sulphur hexafluoride.

6. Electrical apparatus of claim 3 in which said gas is sulphur hexafluoride, and said liquid dielectric material is cyclic $C_8F_{16}O$.

7. The method of cooling an electrical conductor whose components define a tortuous fluid flow path through the interior thereof comprising introducing a vaporizable mist of a volatile dielectric liquid into a gaseous dielectric material, said gaseous dielectric material being noncondensable in the normal operating temperature range of said conductor, the impetus of said vaporizable mist, as it is introduced into said gaseous dielectric material but before it is circulated thereby, being insufficient to cause its movement through said tortuous path, and circulating said gaseous dielectric material at a velocity sufficient for the gaseous material to carry said mist in heat transfer relationship through the tortuous path in the interior of said conductor.

8. The method of cooling an electrical winding whose components define a tortuous fluid flow path through the interior thereof comprising introducing a vaporizable mist of a volatile liquid dielectric material in a gaseous dielectric material in sufficient concentration to supersaturate said gaseous material, said gaseous dielectric material being noncondensable in the normal operating temperature range of said winding, the impetus of said vaporizable mist, as it is introduced into said gaseous dielectric material but before it is circulated thereby, being insufficient to cause its movement through said tortuous path, circulating said gaseous material at a velocity sufficient for the gaseous material to carry said mist through the tortuous path in the interior of said winding, and cooling said gaseous material to condense vapors of said liquid material.

9. The method of cooling an electrical winding whose components define a tortuous fluid flow path through the interior thereof comprising introducing a vaporizable mist of a volatile liquid dielectric material in a gaseous dielectric material in sufficient concentration to supersaturate said gaseous material, said gaseous dielectric material being noncondensable in the normal operating temperature range of said winding, the impetus of said vaporizable mist, as it is introduced into said gaseous dielectric material but before it is circulated thereby, being insufficient to cause its movement through said tortuous path, circulating said gaseous material at a velocity sufficient for the gaseous material to carry said mist through the tortuous path in the interior of said winding at a rate that heat dissipated by said winding evaporates substantially all of the liquid phase therein, and cooling said gaseous material to condense the vapors of said liquid material.

10. An electrical apparatus comprising an electric device in a sealed enclosure, said electrical device having elements thereof spaced from each other so as to define a tortuous fluid flow path through its interior, at least one portion of said path being perpendicular to another portion of the path, a dielectric gaseous material in said enclosure, said gaseous material being noncondensable within the normal operating temperature range of said apparatus, means for circulating said gaseous material so that it flows through the tortuous path in the interior of the device, some of said gaseous material flowing through the perpendicular portion of the path, a volatile dielectric liquid having a boiling point within the normal operating range of said device, and means for spraying a vaporizable mist comprising fine droplets of said liquid in the circulation path of said gaseous material, said spraying means imparting insufficient impetus to said vaporizable mist to cause its circulation through said tortuous path, the first mentioned means circulating said gaseous material at a velocity sufficient for said gaseous material to carry said fine droplets through said tortuous path into contact with the interior of said device, some of said fine droplets flowing through the perpendicular portion of said path, whereby evaporation of said fine droplets will cool the interior of said device.

11. The method of cooling an electrical conductor whose components define in the interior thereof a fluid entrance channel and a plurality of fluid distribution channels substantially perpendicular to the fluid entrance channels, comprising the steps of entraining fine vaporizable droplets of a volatile dielectric liquid into a gaseous dielectric material travelling at a velocity sufficient to carry said droplets, said gaseous dielectric material being noncondensable in the normal operating temperature range of said conductor, the impetus of said vaporizable droplets, as they are entrained in said gaseous dielectric material but before they are carried thereby, being insufficient to cause their movement through said fluid distribution channels, flowing the gas entrained droplets into said fluid entrance channel, then flowing the gas entrained droplets into the fluid distribution channels, contacting the components defining said channels with said droplets, whereby evaporation of said droplets cools the interior of said conductor.

References Cited in the file of this patent

UNITED STATES PATENTS

| | | |
|---|---|---|
| 717,006 | Johannesen | Dec. 30, 1902 |
| 2,118,949 | Scott | May 31, 1938 |
| 2,200,442 | Crawford | May 14, 1940 |
| 2,759,987 | Narbutovskih | Aug. 21, 1956 |
| 2,817,959 | Lustwerk | Dec. 31, 1957 |
| 2,849,525 | Berberich | Aug. 26, 1958 |
| 2,875,263 | Narbutovskih | Feb. 24, 1959 |

FOREIGN PATENTS

| | | |
|---|---|---|
| 661,531 | Great Britain | Nov. 21, 1951 |

OTHER REFERENCES

Camilli: "Gas-Insulated Transformers," published in General Electric Review, May 1956, pages 41–44.